United States Patent [19]
George, Jr.

[11] Patent Number: 5,195,881
[45] Date of Patent: Mar. 23, 1993

[54] SCREW-TYPE COMPRESSOR/EXPANDER WITH VALVES AT EACH AXIAL END OF ROTORS

[76] Inventor: Leslie C. George, Jr., P.O. Box 15743, New Orleans, La. 70175

[21] Appl. No.: 822,860

[22] Filed: Jan. 21, 1992

Related U.S. Application Data

[62] Division of Ser. No. 682,306, Apr. 9, 1991, Pat. No. 5,121,607.

[51] Int. Cl.[5] .................. F04C 18/16; F04C 29/08
[52] U.S. Cl. ........................... 418/97; 418/152; 418/201.2
[58] Field of Search .......... 418/97, 152, 159, 201.1, 418/201.2, 270

[56] References Cited
U.S. PATENT DOCUMENTS

| | | | |
|---|---|---|---|
| 2,656,972 | 10/1953 | Rathman | 418/201.1 |
| 3,088,658 | 5/1963 | Wagenius | 418/201.1 |
| 3,120,814 | 2/1964 | Mueller | 418/159 |
| 3,307,453 | 3/1967 | Nilsson et al. | 418/201.1 |
| 3,977,818 | 8/1976 | Sprankle | 418/201.2 |
| 4,025,244 | 5/1977 | Sato | 418/97 |
| 4,362,472 | 12/1982 | Axelsson | 418/201.2 |

FOREIGN PATENT DOCUMENTS 577937 7/1958 Italy .................... 418/201.2

*Primary Examiner*—John J. Vrablik
*Attorney, Agent, or Firm*—Laubscher & Laubscher

[57] ABSTRACT

A screw-type compressor/expander including a housing having inlet and outlet ends and two matching profile rotors with male and female lobes helically wrapped to form endless screws is characterized by end plates having spaced ports arranged at each axial end of the rotors and valve gates slidable with respect to other end plates to select either compression mode ports or expansion mode parts. When the expansion mode ports are selected, the rotors and housing enclose spaces initially opening to the inlet end that have a volume that expands as the rotors are turned. When the compression mode ports are selected, the rotors and the housing enclose spaces initially opening at the inlet end and then closing such that the volume of the spaces contracts as the rotors are turned.

4 Claims, 5 Drawing Sheets

FIG. 5
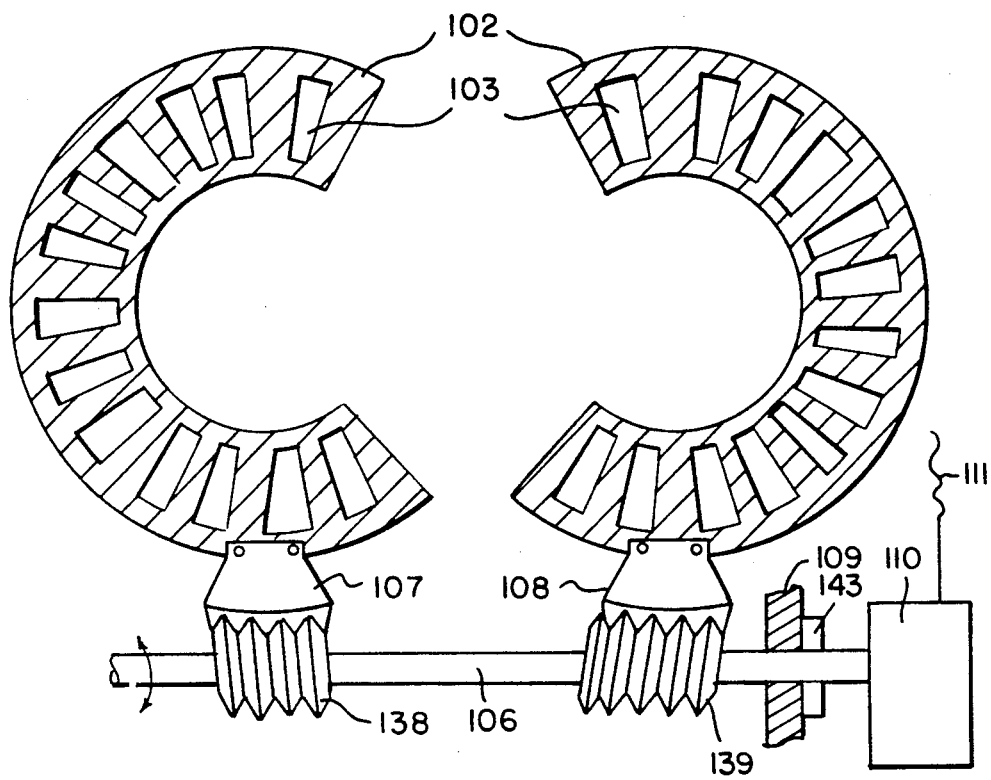
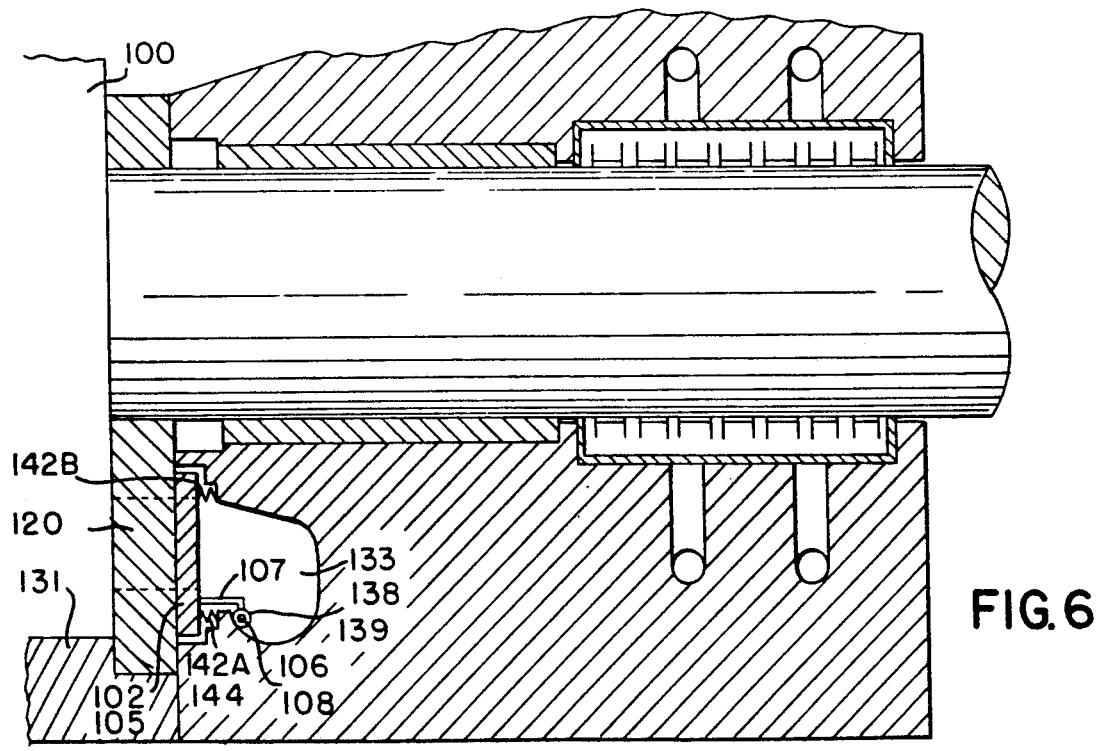
FIG. 6

SCREW-TYPE COMPRESSOR/EXPANDER WITH VALVES AT EACH AXIAL END OF ROTORS

This application is a division of application Ser. No. 07/682,306, filed Apr. 9, 1991, now U.S. Pat. No. 5,121,607.

FIELD OF THE INVENTION

The subject invention relates to a system for the recovery of heat energy from the exhaust of internal combustion engines of vehicles by employing a Rankine cycle and utilizing fluid (i.e., steam) from this cycle in a regenerative braking and start-up cycle.

BACKGROUND OF THE INVENTION

Rankine cycles utilizing water and steam and/or low boiling point organic fluids have been proposed to recover heat energy from exhaust. These systems have not been efficient enough to justify commercialization. Regenerative braking systems which retard a vehicle and store the braking energy for restart are known. They are heavy and costly. Their use is justified only in city buses which stop and start frequently.

Currently, "adiabatic" or low heat rejection engines (LHRE) are being developed in which ceramic materials are used to insulate the internal parts adjacent to the combustion area. The actual gain in fuel efficiency is only 3 or 4%. The objective appears to be to make the engine lighter, simpler and cheaper by reducing the size and complexity of the cooling system or eliminating it altogether. In the exceptionally efficient conventional diesel engine, the conversion of fuel energy is generally as follows: 38–40% is converted to mechanical power, 25% is rejected to the engine's cooling and lubricating fluids, and 35% as thermal energy in the exhaust. The LHRE design with its reduction of heat loss to the cooling system could result in an exhaust heat content of 42%, and the percentage would increase the nearer the design approached the non-cooled state, so that if cooling were eliminated,, the exhaust energy content could approach 55–57%.

Further developments are taking place to utilize this heat lost to the exhaust. An experimental Rankine cycle with a once-through boiler but no drum and using a synthetic working fluid has demonstrated an improvement of fuel economy of 12% in a conventionally cooled diesel powered truck. Studies show that with the LHRE attaining an exhaust temperature of 1,240–1600° F., an efficiency of 15–35% could be attained using water and steam. Previous Rankine cycles utilized a once-through boiler which had no storage drum with a feed pump pumping the fluid through coils in the exhaust passage.

Various retarders have been developed to aid heavy duty vehicles in slowing down during a braking period, thus reducing the need to apply the friction brakes and saving brake maintenance costs and downtime. The retarders employed include: (1) an exhaust brake, in which an auxiliary valve in the engine exhaust system cuts off the exhaust gas flow through the exhaust pipe and creates a high back pressure, thus increasing the pumping loss of the engine; (2) an electromagnetic retarder in which a resistance motor is connected with the drive shaft of the vehicle and can be activated to produce braking resistance; and (3) a hydrodynamic retarder which is similar to a fluid clutch in which an oil submerged turbine rotor revolves against a stator. These retarders add to the cost, weight and maintenance of the vehicle.

There have also been developed and offered on the market what are called regenerative braking systems. These systems offer the advantages of the retarders, are more effective, and conserve the braking energy or the vehicle for use when the vehicle accelerates from a stop.

Gyroscopic regenerative systems use braking energy to speed up a gyro wheel through a constantly variable transmission (CVT). The braking energy is stored in the rapidly revolving wheel, and the wheel is connected through the CVT to accelerate the vehicle from a stop. In hydrostatic regenerative braking systems, the energy of braking is utilized to pump oil from a storage receptacle or tank to a high pressure in a gas (i.e. nitrogen) filled tank (to a pressure of over 5,000 or 6,000 psia). On getting under way, the pressurized gas forces the oil through an oil motor geared to the transmission or to the drive shaft of the vehicle to start the vehicle moving or to assist the vehicle in accelerating. These systems add to the cost and weight of the vehicle. They save on fuel cost and brake overhaul and have environmental benefits, but the investment is justified only in city buses which stop with great frequency.

SUMMARY OF THE INVENTION

According to the invention, there is provided an energy recovery system for a wheeled vehicle driven by an internal combustion engine connected through a transmission to a vehicle drive train for transmitting torque to and from the vehicle wheels. The heat in the exhaust gases in the exhaust line from the internal combustion engine is recovered using a Rankine cycle with a working fluid and braking energy is recovered by compressing and expanding the working fluid.

A compressor/expander is connected with the vehicle drive train through a lock-up clutch such that when the-compressor/expander is o as an expander in a run mode, it assists the engine in driving the vehicle and when operated as a compressor in a braking mode, it stores braking energy. A heat exchanger such as a boiler, a boiler drum, and a flash chamber are connected such that the heat from vehicle exhaust gases is transferred to a working fluid for generating both high-pressure vapor and low-pressure vapor. The boiler drum stores the heated and vaporized liquid and supplies high-pressure vapor to an inlet port of the compressor-/expander during the run mode. The flash chamber supplies low-pressure steam to the inlet port of the compressor/expander during the braking mode. During the braking mode, the compressor/expander compresses the low-pressure steam into storage tanks from which it is released during a subsequent run mode.

Preferably, the compressor/expander may be switched from the compressor mode to the expander mode and vice versa without changing the inlet and outlet ports and without changing the direction of rotation of the rotating elements therein. The compressor-/expander may comprise, for example, a screw compressor, a V-type piston compressor, a Boxer-type piston compressor or a rotary compressor.

In a most preferred embodiment, the compressor/expander comprises a screw compressor. Screw compressors have a housing including an inlet end and an outlet end and two matching profile rotors with male and female lobes helically wrapped to form endless screws. An improved screw compressor suitable for the present invention comprises end plates at each axial end of the rotors. The end plates have spaced ports. Valve gates are arranged to slide over each end plate to select the compression mode or the expansion mode. If ports for the expansion mode are selected, the rotors the housing enclose spaces initially opening to the inlet end that have a volume that expands as the rotors are turned. If compression mode ports are selected, the rotors and the housing enclose spaces initially opening at the inlet end and then closing such that the volume of the spaces contracts as the rotors are turned. Preferably, the valve gates are rotating disk-type valves comprising gear teeth meshing with corresponding gear teeth located on a rotatable shaft. The disk-type valve can be positioned by the rotation of the shaft driven by a solenoid or servo motor thereby opening and closing the ports.

More preferredly, portions of the screw compressor are made of ceramic material or of steel coated by a ceramic layer. According to one embodiment, means for injecting liquid into the compressor are provided for desuperheating of compressed fluid or expanded fluid, respectively.

The screw compressor may be equipped with an expansion ratio modulation system. Under low load conditions, there could be an over-expansion of the fluid which could be a drag on the unit. By means of a capacity control modulation system, slots in the last stages are opened by a slide valve venting these stages to the exhaust, giving early exhaust at low loads. This capacity control modulation system is known in screw compressor applications. Also, in two or more expansion stages, the lower pressure compressors could be by-passed.

Preferably, a condenser is provided for condensing the working fluid flowing from the outlet port of the compressor/expander and returning it to the boiler drum. The working fluid is recirculated enabling a controlled mixing of the recirculated fluid with working fluid cooled in the condenser. Sensor means senses the temperature of the working fluid mixture entering the heat exchanger, the temperature of the boiler circulating fluid, and the temperature of the feed fluid. At least one control unit controls the mixing of the recirculating fluid with the working fluid cooled in the condenser.

Preferably, the power train comprises a constantly variable power transmission (CVT) having a shiftable power takeoff (PTO) to which the compressor/expander is mechanically connected. In a preferred embodiment, a built-in hydrodynamic retarder is provided to assist in braking. Still further, a torque converter is provided between the lock-up clutch and the power transmission.

In an embodiment, one adjustable back pressure regulator between the compressor/expander and the storage tanks adjusts the discharge pressure of the compressor. Also, a bypass regulator is provided between the back pressure regulator and the storage tanks for disconnecting the storage tanks during the braking mode and connecting the high-pressure vapor directly to the condenser when the storage tanks are filled at maximum pressure.

In yet another embodiment, a particulate trap oxidizer is provided in the exhaust line located between the engine and the boiler comprising a burner, ignition means, fuel and air valve means, a first pressure sensor before the trap and a second pressure sensor at the outlet of the trap. Also, a positive displacement variable output or variable capacity supercharger of screw, roots or vane type for supplying excess air to the engine is directly connected to and mechanically driven by the engine.

In the system according to this invention, steam, for example, is pumped by means of a compressor directly into storage tanks. The source of the steam is a boiler of a Rankine cycle system. In order to pump from a low pressure to a higher pressure and thus load the braking, low-pressure steam is produced in a flash chamber which develops steam from flashing hot condensate from a boiler drum at high pressure in a chamber of lower pressure. The Rankine cycle expander is utilized as a compressor, compressing the fluid using the braking energy, and at the same time retarding the vehicle. Thereafter, as an expander, it utilizes the high-pressure fluid from the tanks to accelerate the vehicle.

In view of the high exhaust temperatures expected from the LHREs, water and steam are preferred fluids, though other fluids such as RC-1, toluene, or similar fluids could be utilized.

In this system, no storage cylinders or tanks for replenishing the fluid would be needed. On utilizing the compressed steam, the expander would exhaust the steam to a condenser in which it would be cooled and condensed to liquid and returned to the system.

The system requires at least one high-pressure storage tank, and two or more if greater storage would be required. Due to the expansible nature of the hot stored fluid the maximum pressure of the storage system would preferably be 1,5000–2,000 psia, with the Rankine cycle system operating at a boiler pressure of 1,000–1,500 psia. The storage would be of a cyclic nature so that in general the hot compressed fluid would be in the tanks only during braking and starting.

In the gyro systems or the hydrostatic systems, when maximum storage capacity had been reached, such as in the case of prolonged braking on a downhill run, continued retarding of the braking would be impossible and the friction brakes would have to be relied upon. In the system disclosed herein, the retarding and braking are not so limited. The compressor driven by the retarding and braking compresses the steam to maximum pressure and storage capacity. The excess is then dumped by the bypass regulator through the regenerator to the condenser, condensing to a liquid and being pumped by a boost and feed pump through a regenerator (i.e., heat exchanger) where it is heated by the bypassed steam and returned to the boiler. Retarding and braking could be continuous. The system could preferably be equipped with a commercially available continuously variable transmission (CVT) equipped with a lock-up clutch, and optionally, a built-in hydrostatic retarder to assist the fluid braking.

Preferably, the compressor/expander drives and is driven by the power takeoff (PTO) of the transmission, and its speed and that of the built-in hydrodynamic retarder is determined by the gear ratio in the transmission which is varied to suit the condition and the braking effectiveness required.

At the end of the braking period, the vehicle is brought to a stop by a final application of friction brakes. At the end of a long downhill run with the high-pressure storage tanks full, the vehicle may continue to run with the system converting to a run mode. The pressure in the storage tanks would be depleted to a determined amount and the engine would then take over, powering the vehicle along with the expander running on the high-pressure steam from the Rankine cycle boiler.

A boiler drum added to the Rankine cycle system acts as a storage and energy reserve, so that although this might increase weight and volume, a smaller, cheaper, and lighter engine may be installed. Hence, the disclosed system takes less space than the existing regenerative braking system, and weighs less and takes less space than previous Rankine cycle systems.

On braking, the compressor offers braking resistance and this is varied by varying the speed of the compressor through the CVT. It is preferable to do maximum braking with the compressor, in order to recoup and store the braking energy. Should this not prove sufficient, a hydrodynamic retarder built into the CVT could also be used and then the engine could be clutched up by means of the lock-up clutch. The engine could also be equipped with an engine brake. The friction brakes would be used as a last resort.

BRIEF DESCRIPTION OF THE FIGURES

Other objects and advantages of the invention will become apparent from a study of the following specification when viewed in the light of the accompanying drawing, in which:

FIG. 5 is a sectional view of a rotor disk valve of the compressor of FIG. 2;

FIG. 6 is a detailed sectional view of a portion of the compressor of FIG. 2 illustrating the mounting of the rotor disk valve.

DETAILED DESCRIPTION

Figure 1:
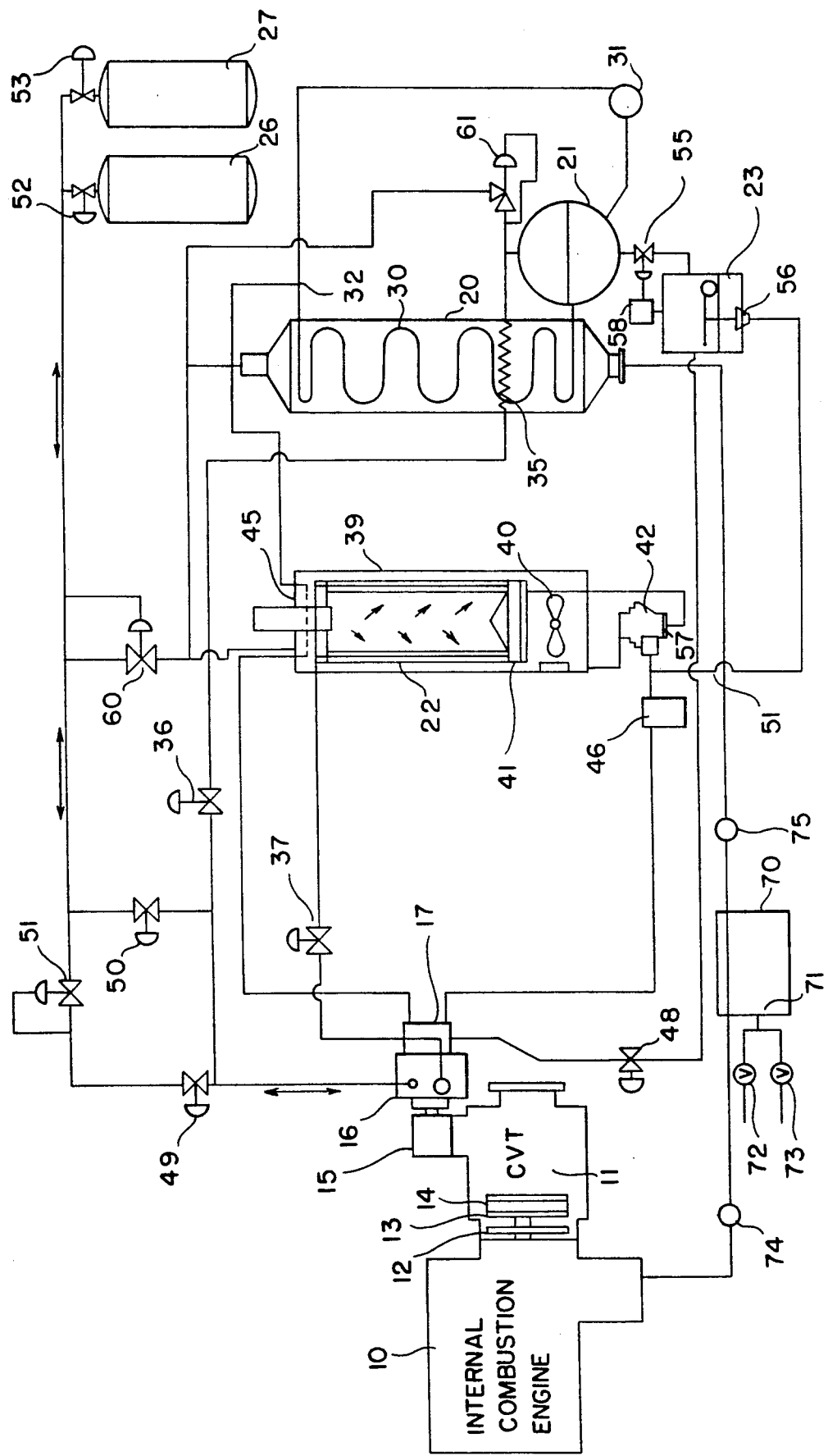
FIG. 1 is a schematic diagram illustrating the energy recovery system according to the invention.

Referring to FIG. 1, an internal combustion engine 10, such as a piston or rotary low heat rejection engine (LHRE) is connected to a continuously variable transmission (CVT) 11, by means of a converter lock-up clutch 12, and a hydrodynamic torque converter 13. The torque converter is utilized when the vehicle is first pulling away in first and second gear. Once the vehicle has pulled away, the converter lock-up clutch 12 bypasses the torque converter 13. A built-in hydrodynamic retarder 14 can be driven by the vehicle in the braking mode. The retarding torque of this retarder would be influenced by its speed determined by the gear ratios of the transmission. A shiftable power takeoff (PTO) 15 on the transmission 11, like the retarder, is vehicle speed dependent. Its speed is determined by the speed of the vehicle and the gear ratio of the transmission. The PTO is shiftable, that is, by means of a clutch it can be disconnected from the transmission, if necessary, isolating the Rankine assist and regenerative braking system from the, power train of the vehicle should there be problems with the system components.

A compressor/expander 16 is connected to the PTO 15 of the transmission. By shifting of valves, this compressor/expander is changed between a compressor mode and back to an expander mode as will be explained in detail below. The compressor/expander is preferably a screw compressor although other mechanisms could be used. A boiler feed pump 17 is directly connected to the compressor/expander 16 and turns at the same speed. The feed pump 17 is of variable capacity to vary the output as necessary.

The system comprises a heat exchanger (i.e., boiler) 20, boiler drum 21, and condenser 22 which with the compressor/expander 16 (in the expander mode) comprise the main elements of a Rankine cycle system. The flash chamber 23 and the high-pressure storage tanks 26, 27 along with the compressor/expander 16 comprise the main elements of the brake energy recovery system.

MODES OF OPERATION

There are four modes of system operation. In the run mode, the diesel engine and the Rankine cycle expander both propel the vehicle in a 70-80 to 30-20 ratio. In the braking mode, the engine may be disconnected from the system and the compressor compresses low-pressure steam from the boiler, retarding the vehicle and storing the compressed steam. In the prolonged braking mode, the vehicle continues to brake after the high-pressure storage tanks fill to capacity. The vehicle continues to brake by continuing to compress steam and retard the vehicle, and the compressed steam is bypassed to the condenser. In the start mode, the compressed fluid in the high-pressure tanks is placed in communication with the inlet of the expander to start the vehicle either alone or with the assistance of the internal combustion engine.

In the run mode, the engine 10 provides motive power for the vehicle, together with the expander 16, both through the transmission. The expander is connected to the PTO 15 of the transmission and the engine is connected to the transmission by means of the converter lock-up clutch 12. Exhaust gas from the engine at, say, 1,240°-1,600° F. is directed to and through the boiler or vapor generator 20 to produce steam at 1,000-1,500 psia, exiting at approximately 350° F. It will be seen that this is a recirculating boiler, equipped with a boiler tank or steam drum 21 which acts as an energy storage vessel. The drum 21 supplies steam for the expander 16 and hot fluid to the flash chamber 23. The flash chamber 23 provides low-pressure steam for the compressor 16. The drum 21 also separates the mixture of water and steam which is returned from the heating coils 30 in the exhaust gas passage of the boiler 20.

Tracing the cycle, boiler circulating pump 31 hot boiler water at 544°-596° F. from the boiler drum and pumps it through the coils in the exhaust stream and back to the drum. At juncture 32, colder feed water from the condenser 22 is introduced into the stream. The cold feed is heated by admixture with the hot boiler water and at the same time it lowers the temperature of the circulating boiler water so that there will be a greater differential between the temperature of the water in the heating coils 30 and the temperature of the exhaust gasses. The cold feed water enters the heat exchanger mixed with the hot recirculating water so that the mixture will be above the acid dew point of 225° F. The water enters the boiler 20 as liquid, but in passing through coils 30, heat is absorbed from the exhaust gases. Some of the water boils and a mixture of steam and water is led back to the boiler drum 12 where they separate. The steam rises to the top half of the drum, is then led through the superheater coil 35, through stop valve 36 (steam supply), to the expander 16, expands and then exhausts through stop valve 37 at the condenser inlet to the air cooled condenser 22 where it is condensed to liquid.

In the condenser, air is drawn in from outside, at approximately 80° F., drawn over condenser cooling coils 39 by fan 40, and exhausted from condenser at approximately 120° F. In cold weather, this warm air can be directed to the driver's cab of a vehicle, or to the interior of a bus for heating. A pressure of 20 psia with a corresponding temperature of 228° F. is maintained in the condenser and the hot well 41 to exclude air from the system. The condensate falls to the hot well of the condenser which serves as a storage for the condensate. The condensate is picked up by the boost pump 42 and pumped to the feed pump 17 via filter demineralized 46. The feed pump 17, which is of variable capacity, will pump this condensate through a regenerator 45 (a heat exchanger) where it will pick up the superheat from the expander exhaust. It then enters the boiler circulating water stream at juncture 32 and then the boiler 20, completing the cycle.

BRAKING MODE

When the brake pedal is applied, the system changes to the braking mode. Stop valve 48 (vapor suction from flash chamber) and valve 49 (discharge to storage) open, stop valve 50 (tank return) remains closed, valve 37 (condenser inlet) remains closed, and valve 36 (steam supply) is closed. Regulator valve 51 is partially open and stop valves 52 and 53 on the storage tanks open. The lock-up clutch 12 disengages, and the engine idles. Regulator valve 55 on flash chamber 23 opens. The valves may be solenoid operated under the control of a microcomputer. Microcomputer controls are standard equipment on today's motor vehicles.

The transmission will be driven from the vehicle wheels and the compressor/expander unit 16, now in the compressor mode, will be driven through the shiftable PTO 15 at varying speeds depending upon the amount of retarding required. Flash chamber regulator valve 55 allows hot boiler water from the drum 21 to enter the flash chamber 23. In the low-pressure flash chamber, the heated water will flash into steam. Condensate drops to the bottom of the chamber and is led through a level control valve 56 to the boost pump discharge and on to the feed pump 17 suction. Check-valve 57 in boost pump discharge will prevent the higher pressure flash chamber condensate from backing up into the boost pump 42 and the condenser 22. The set pressure in the flash chamber 23 is determined by pressure sensor 58 which controls opening of the regulator valve 55. The compressor/expander now in the compressor mode, takes suction from the flash chamber 23 through stop valve 48. Through stop valve 49, the compressor discharges to the back pressure regulator valve 51 which maintains a set back pressure against the compressor discharge, thereby loading the compressor, and when the maximum or desired pressure is reached, the regulator valve will bypass the excess pressure steam to the storage tanks 26 and 27 in stages through their stop valves 52, 53. The final discharge pressure of the compressor will be determined by the compression ratio, the initial suction pressure from the flash chamber, and the speed of the compressor as determined in the gear ratio of the transmission. As the braking vehicle slows down, the transmission would keep the compressor pumping at maximum capacity. At the beginning of braking, the storage tanks are empty and at low pressure so that there is little resistance to the compressing and little braking. Thus, the back pressure regulator 51 is interposed in the line between the compressor and the tanks, and by maintaining a back pressure against the compressor, provides a braking load on the drive wheels of the vehicle, and this load can be varied by the speed of the compressor. Should this braking at maximum not be sufficient or if there should be heavy demand upon the regenerative braking system, the transmission could be equipped with an optional built-in hydrodynamic retarder 14 which would be activated to assist in the braking. However, it would be employed only when the regenerative system was operating at maximum in order to conserve as much of the braking energy in the storage tanks as possible. Using the engine to brake and the friction brakes would be a last resort.

PROLONGED BRAKING MODE

It has been mentioned that known regenerative braking systems have limits to their retarding and braking. With the hydrostatic systems, once the storage tanks have been filled to capacity, the oil pump can no longer be employed to load the system, and the friction brakes would have to be resorted to, along with using engine braking at a lower gear with consequent wear on the engine. In the described system, in the case of prolonged braking such as down a long mountain grade, when the storage tanks 26, 27 are full at maximum pressure, the pressure actuated bypass regulator valve 60 will function as a dump valve. It will begin to open and relieve this excess pressure through the regenerator 45 to the condenser 22. Bypassing slightly superheated steam (at 1,500 psia, the temperature would be approximately 600° +F.) would load the condenser 22 to a pressure of 50 psia and a temperature of 280° F. This would in turn increase the differential between the ambient temperature and the temperature of the steam in the condenser, so that there would be an increase in rejection of heat to ambient. The condensate would now be 280° F., and the feed leaving the feed pump would be slightly above that, perhaps going to the regenerator at 285° F. In the regenerator it would be heated by the 600° F. steam being dumped from the high-pressure storage system so that it enters the boiler at above boiler temperature at 550° F. With continued braking, the boiler is heated and builds up a pressure beyond set operating maximum, in which case the pressure actuated relief valve 61 would open leading this excess pressure to the condenser. During this extended downhill braking, the engine could be stopped entirely, relying upon the system to retard the vehicle, and, if necessary, utilizing the built-in hydrodynamic retarder 14. The vehicle would arrive at the bottom of the grade with full storage tanks. If the vehicle stopped, the stored pressure would be utilized to start and accelerate the vehicle. If the vehicle continued on route, the stored pressure could be used up in propelling the vehicle with the engine cutting in when the pressure has been reduced and the tanks closed off.

STARTING MODE AND RUNNING

When stopping of the vehicle has been completed, the system may be placed in RUN mode. The engine is idling or stopped, and the lock-up clutch 12 disengaged. Valve 48 (vapor suction from flash chamber) is closed. Valve 49 (discharge to storage tanks) is closed. Regulator valve 51 is closed (no pressure is being pumped against it). Regulator dump valve 60 is closed. Valve 36 (steam supply) is closed. Valve 37 (condenser inlet) is now open, valve 50 supplying the expander with steam pressure from tanks 26 and 27, and valves 52 and 53 are opened. The compressor/expander unit is now in the expander mode. The degree of admission is increased during starting creating considerable torque and moving the vehicle through the low ratio gearing of the CVT to the higher ratio gears. The vehicle could start on steam power only, using the stored steam. As the storage tanks become depleted, the diesel could be started by engaging the lock-up clutch and assist in accelerating the vehicle. Once the engine is producing power, the hot exhaust gas would be going through the boiler again. When the storage tanks 26 and 27 are depleted to a set amount, valves 52 and 53 closed. Valve 50 (tank return) closes, no longer feeding steam to the expander, and boiler stop valve 36 (steam supply) opens.

SUPERCHARGING

Figure 7:
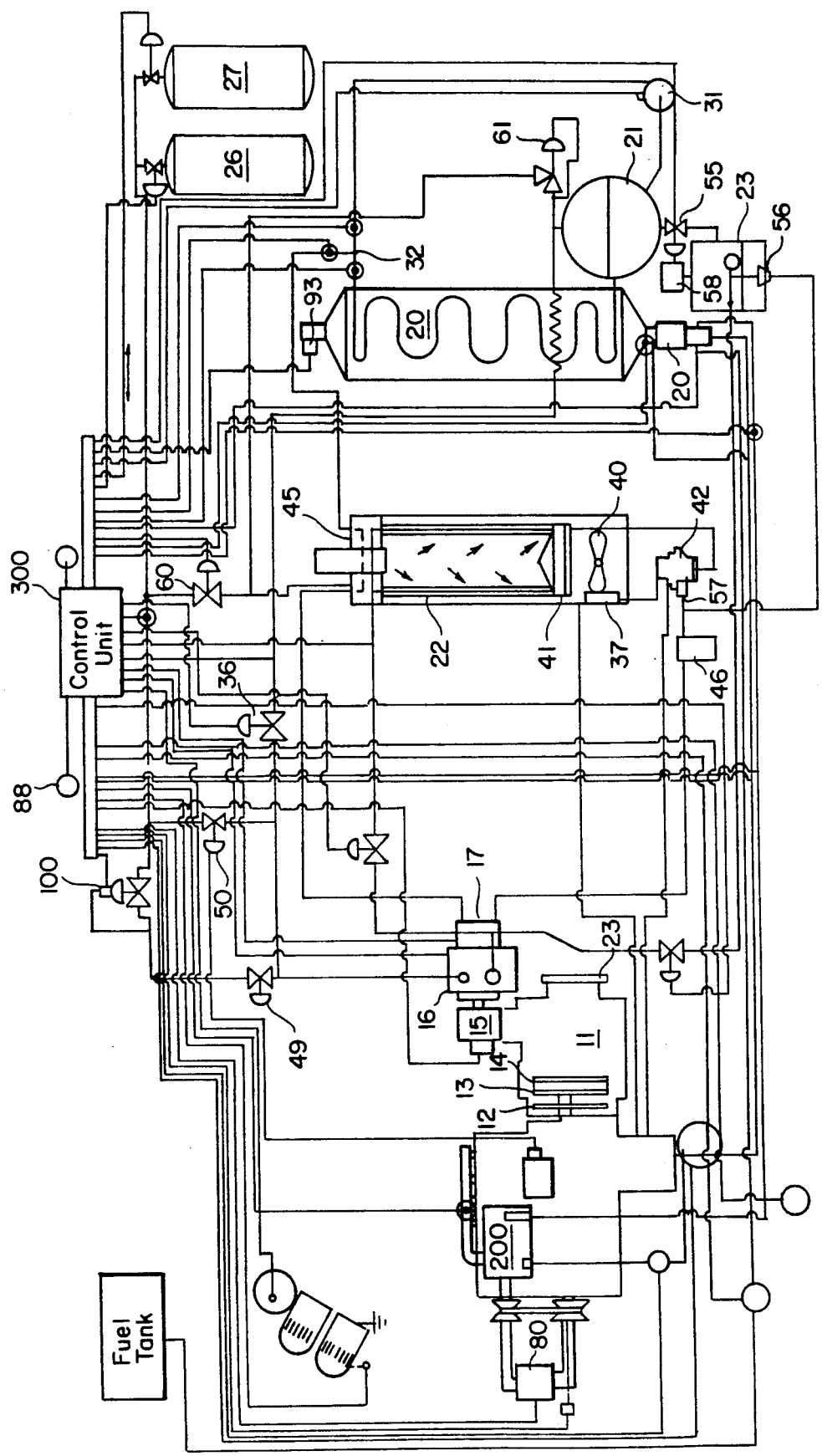
FIG. 7 is a schematic diagram of the control circuit for the energy recovery system.

One of the greatest causes of the formation of particulates in a diesel engine, particularly during starting and accelerating, is the relationship of quantity of combustion air to the fuel being injected into the engine. Most medium and heavy-duty vehicle diesel engines are turbocharged. The energy in the exhaust gases of the engine is used to drive a turbine driven compressor which pumps air to the intake manifold of the engine, supplying more air so that more fuel can be burned in a given sized engine thus producing more horsepower. One of the major problems of the turbocharger diesel engine is that during starting or sudden acceleration, there is a puff or plume of black smoke from the exhaust. With a turbocharged engine, when additional fuel is injected into the engine, there is not enough air on hand to properly burn the additional quantity of fuel injected. The fuel will have to be burned and the exhaust gases led to the turbocompressor where the inertial resistance of the unit will have to be overcome as well as line resistance in the air manifold ducting which will increase if intercooling is used. This delay in getting the additional air to the combustion process is known as "performance lag" or "turbo-lag" and takes from two to four seconds. At this time, the engine is slow in its response, particularly if running at low speed. This can be compensated for in part by designing the turbocompressor for greater output at low speeds, so that at higher speeds it has over capacity so that its output will have to be vented or "wastegated" or the exhaust bypassed around it. Turbocharging has been favored because it does not cost anything in fuel consumption since it is being run on exhaust gas energy which would have been wasted anyway. However, such systems are not all gain because interposing a turbine in the exhaust stream produces a back pressure against the engine which represents a pumping loss to the engine. If a second turbine is interposed, as in turbocompounding, there is again an increase in back pressure and engine pumping losses. Turbocharger output will have to be increased to overcome this back pressure. It has been found that in utilizing a mechanically driven positive displacement supercharger 200 (FIG. 7) screw, root, vane, or other type directly connected to and being driven by the engine by means of V-belts, chain belts or gears that the response time or lag is 0.4 seconds is compared to the 2.0 or more seconds of the turbocharger, and the engine is more responsive to the demand for additional power. However, it will be seen that there is still a lag during which particulates and unburned hydrocarbons will be expelled with the exhaust. It will be seen that when the additional fuel is injected into the engine, the fuel will have to be burned to increase the engine speed so that the supercharger speed and output will be increased in order to supply the additional air to burn the fuel. According to a preferred system, speed and output of the supercharger is varied by a V-belt or chain belt drive utilizing variable diameter sheaves or pulleys. Such an arrangement can have a speed ratio range of over 6:1 so that the speed and output of the supercharger could be varied independent of the engine speed. On starting, for example, the microcomputer control 300 (FIG. 7) adjusts the sheaves for increased charger output meanwhile delaying the injection of the fuel until there is a more adequate air supply, then fine adjusting to the combustion demand. Thereafter, with any increase in power demand, the control unit will sense movement of the accelerator and will increase air supply in relation to the increased fuel injected and in relation to the combustion process which will be determined by pressure and temperature sensing points, exhaust gas and engine RPM sensor.

A supercharger being of positive displacement will not have to run at the high RPM of the turbocharger and will eliminate one of the problems of a turbocharger pertaining to the lubrication of bearings in proximity of the hot engine exhaust. With mechanically driven superchargers, it will produce an additional power increase of 10% with a reduced brake specific fuel consumption. However, studies indicate that utilizing the exhaust in a Rankine cycle as covered by this invention could increase horsepower by 35% and reduce BSFC by 25%.

As stated, there has been a preference for the development of turbocharging since this utilized the otherwise wasted heat energy in the exhaust gases, whereas it was considered that the engine driven supercharger was a load on the engine output. It should be noted, however, that eliminating the turbocharger reduces the back pressure against the engine and reduces the engine pumping losses, particularly if a Rankine cycle is used rather than an expander in the exhaust line. It might be noted too that with a Rankine cycle there is no need to interpose an intercooler between the supercharger discharge and the engine intake manifold. The intercooler would remove heat from the charge air which would otherwise be recovered in the boiler.

A particulate trap oxidizer 70 is provided in the exhaust line located between the engine and the boiler. The oxidizer is provided with a burner 71 with connected fuel and air valves 72, 73. Pressure sensors 74, 75 are placed before and after the trap. The burner keeps the boiler hot for quick starting and to prevent freezing.

SCREW TYPE COMPRESSOR EXPANDER

Figure 2:
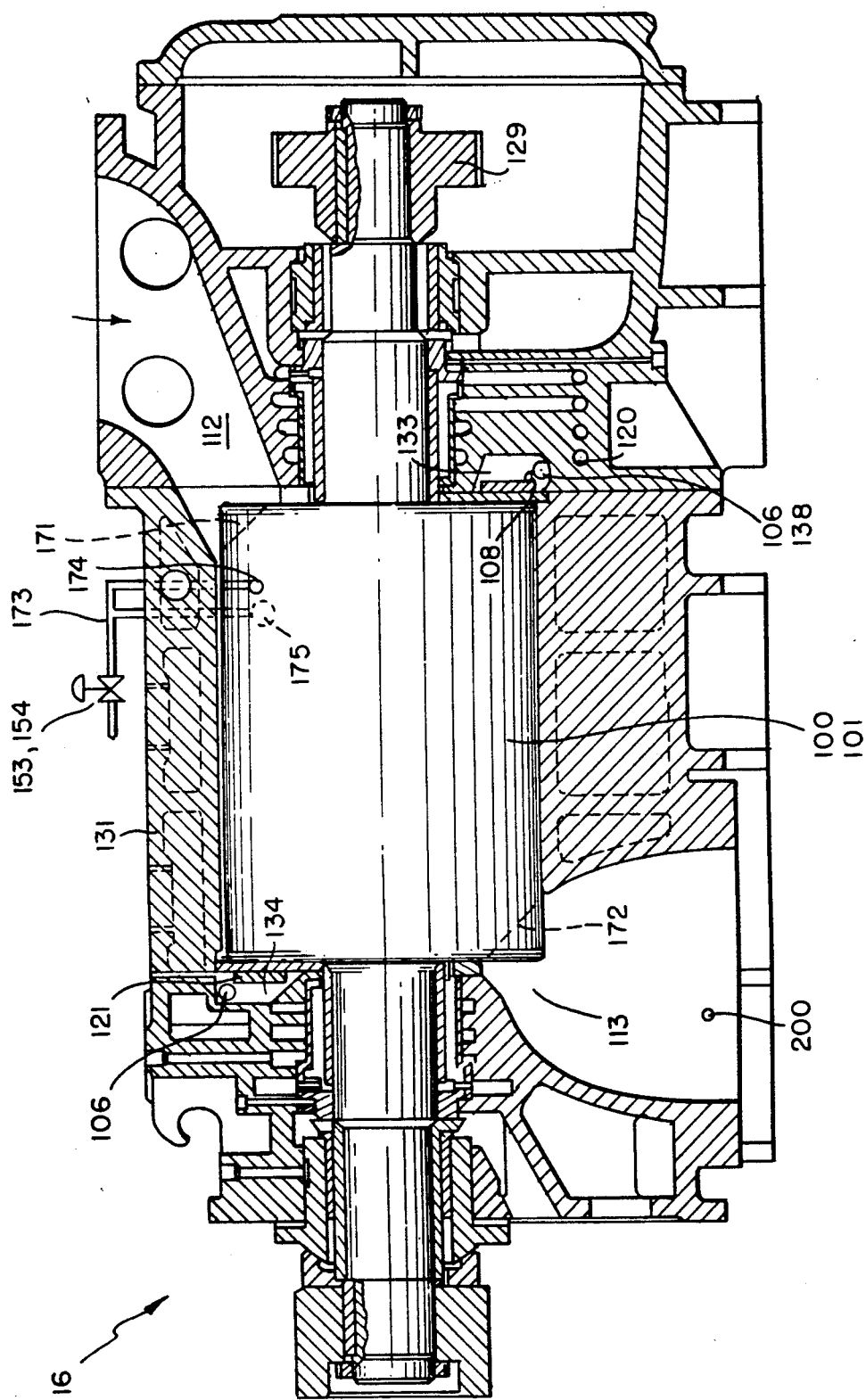
FIG. 2 is an axial sectional view of a screw, compressor for use with the invention of FIG. 1.
Figure 3:
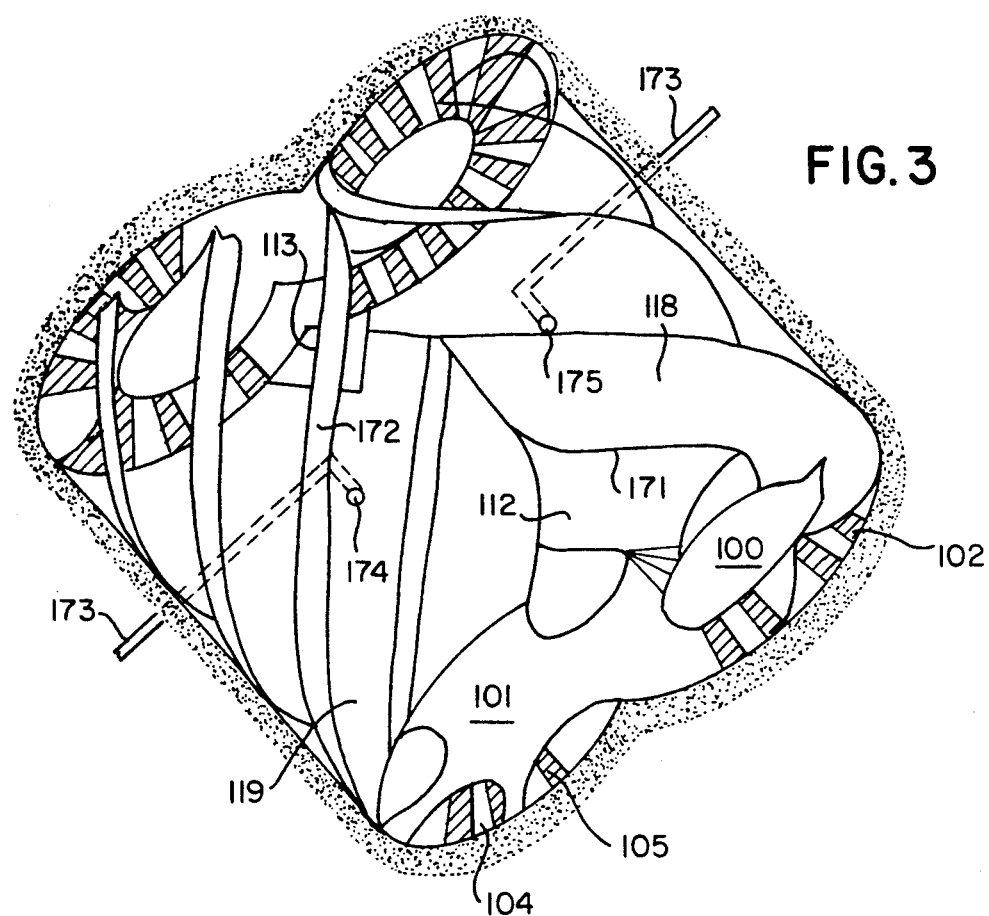
FIG. 3 is a perspective interior view of a portion of the compressor of FIG. 2.

Preferably, the compressor/expander comprises a screw compressor shown in FIGS. 2-6 which can also function as an expander without changing the direction of flow of the compressed or expanded fluid or the rotational direction of the rotors. Referring first to FIGS. 2 and 3, in a screw compressor with two screw rotors 100, 101, the male and female lobes 118, 119 are intermeshed. The interlobal spaces function as compression chambers as the rotors rotate. As a compressor, the fluid enters the unit through a nozzle 112 and suction chamber 133 at the inlet end. As the rotors rotate, the chamber increases in size to maximum volume drawing in fluid from the suction end, and as they continue to rotate, the meshing lobes decrease the chamber volume compressing the fluid against the outlet end plate 121 until the outlet or discharge nozzle or port 113 is reached and the pressurized fluid is discharged. The degree of compression is determined by the size or the outlet port, which is a V-type construction with control ledges 172 at the same angle as the lobes. When the lobes reach and cross the ledges, the compressed fluid is discharged.

The intermeshed rotors are mounted in a casing 131 with end plates 120, 121 at either end. There is no contact between the rotors and the casing or end plates or each other. The rotors are held in position by timing gears 129 mounted in the end housing.

Screw compressors have been used as expanders simply by changing the direction of rotation of the rotors and reversing the direction of flow of the fluid through the unit. Since the direction of rotation, of the drive train of a wheeled vehicle is the same when braking or accelerating, this is not desirable. On braking of the vehicle, the screw compressor as disclosed herein operating as an expander will immediately change to the compressor mode to brake the vehicle, utilizing the inertia to compress and store fluid; and when the vehicle accelerates, it will immediately change to expander again, without the need of changing direction of rotation or direction of flow of the fluid.

Figure 4:
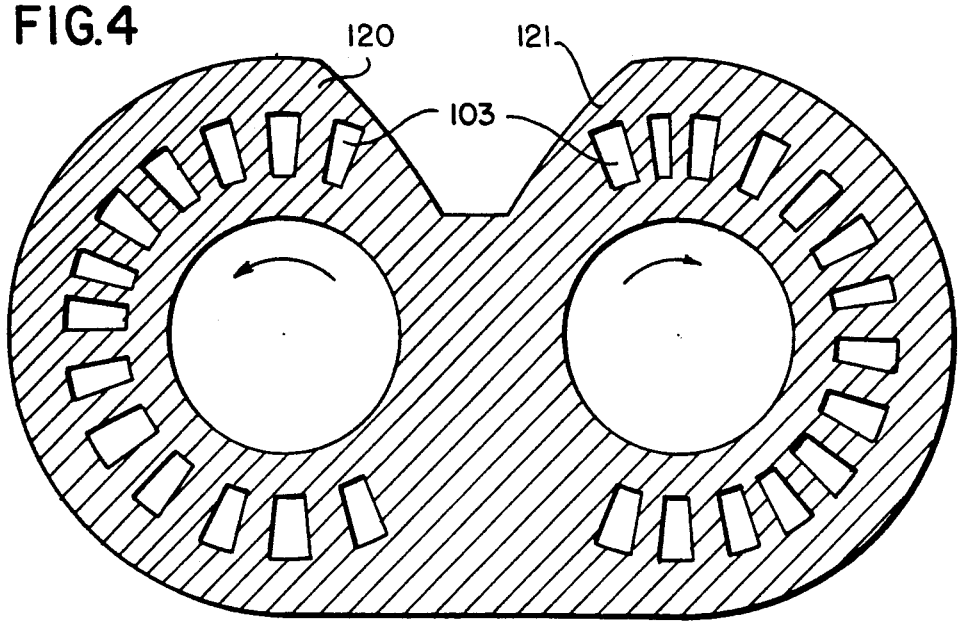
FIG. 4 is a sectional view of an end plate of the compressor of FIG. 2.

Referring to FIGS. 4 and 5, the invention provides a means by which, at the inlet end of the screw compressor, the large area required for compressor service can be reduced to a small inlet port for expander service by means of installing a ceramic end plate 120 with ports or slots 103 which can be closed off by a rotating ceramic disk valve 102 in the expander mode, forcing the fluid to enter the unit through the main nozzle or port 112. At the outlet end of the unit, the end plate 121, which is closed off by a rotating ceramic disk valve 105 in the compressor mode so that the fluid is continually compressed until the rotor lobes reach the outlet control ledges, has ports or slots 104 cut into it so that in the expander mode more area is provided for the discharge of the expanded fluid. By means of these ports and valves, the unit can be changed from compressor mode to expander mode by simply closing and opening these valves, without changing the direction of rotation of the rotors or the direction of the flow of the fluid, which in either mode is from inlet to outlet end.

According to this invention, the rotors and shafts as well as the casing are constructed of ceramic materials, such as partially stabilized zirconia (PSZ) or silicon nitride, although in the interest of economy, a casing of conventional material employing a ceramic liner could be used. These materials are harder and stronger than steel as well as being lighter, have a lower coefficient of expansion as well as resistance to thermal deformation, and would allow closer radial and axial clearances, eliminating the necessity for oil cooling and sealing. Further, radial bearings of ceramic self-lubricating material or ceramic roller bearings could be employed.

The screw compressor can be used for compressing steam which results in significant superheating due to the thermodynamic features of the steam as well as an interstage leakage. However, screw compressors are relatively insensitive to liquid incursions, so that liberal water injection can be utilized for desuperheating the steam as well as sealing. The desuperheating must be such as not to reduce the efficiency. A temperature sensor 200 is provided in the discharge line of the screw compressor which will send a signal to a microprocessor control unit, which in turn will control the amount of water injected through nozzles 174, 175 by the degree of opening of an injector valve 153, 154. The water could be injected via a line 173 through the suction of the compressor, but if used as a steam expander there is the possibility that excess water would run down and accumulate in the suction chamber. The water is injected through the casing into the compression-expansion space after the lobes 118, 119 have passed the inlet port ledges 171. The compressed fluid will desuperheat but still retain some superheat for storage. On expanding, there will superheat in the stored fluid and there will be superheating due to leakage and fluid friction in the expansion stages. Hence, it is desired to desuperheat in the lower stage of the expansion so that the exhaust will be brought to near to or below the saturation point so that condensation in the condenser will be more rapid with less heat loss to the cooling medium.

In a dual purpose unit, the end plates cover and close off chambers 133, 134 in the end housings. The opening and closing of the valve makes possible the inlet and outlet of the fluid through these chambers. These chambers or spaces are located at each end of the screw compressor and might be referred to as left hand and right hand chambers, following the rotation arc of the rotors, extending on each side from the inlet control ledges 171 at the top inlet end and to about 40 degrees past bottom dead center, an from the outlet control ledges 172 at the bottom to about 40 degrees past top dead center. As shown in FIG. 5, valves have an extension with gear teeth 107, 108 which mesh with right and left hand screws 138, 139 mounted on a control shaft 106 which extends externally from the housing 109. The control shaft is rotated by a solenoid or servo motor 110 on a signal from the microprocessor control unit via line 111 opening and closing the ports for the desired mode of operation.

Referring now to FIG. 6, the valves fit in recesses 144 in the end housings which hold the end plates against the housing. The recesses serve as guides for the rotating valves. The valves are held against their seat on the end plate by corrugated springs 142A, 142B which follow the contour of the disk valves 102, 105. Spring tension should be such that the valves will be firmly seated, but it will be noted that at all times when closed, fluid pressure in the inlet or outlet chambers will be equal to or higher than the fluid pressure within the compression or expansion chambers, so that the disk valves will not be lifted from their seats by internal pressure. When changing from expander to compressor mode, there will be a low pressure in the discharge chamber and line, so that pressure in the compressor chambers will momentarily exceed that in the chamber, tending to lift the valves from their seats against the valve plate. Here, the close fit of the valves in the recess holds them seated against the plate until pressure in the chamber is built up to exceed that in the compressor chambers. The width of the slots 103, 104 shall not be greater than the width of the rotor lobes 118, 119, so that the slot when closed is fully covered as the lobe passes over it, preventing blowby of the fluid through the slot from a higher pressure chamber to an adjacent chamber of lower pressure.

Except for inlet nozzle 112 and outlet nozzle 113, the housing is closed off at inlet and outlet ends by end plates (FIG. 4) which are duplicates. At the inlet end, the plate is notched at the top for nozzle 112 and at the outlet end the notch is at the bottom for nozzle 113. Normally, as a compressor, the screw compressor has a chamber or cavity which circles down from an inlet area to give the compressor maximum suction area. At the outlet end, the plate would be blank except for the outlet nozzle to ensure compression until the outlet control ledges are reached.

FIG. 5 is a sectional view of the end valve 102 showing slots 103 in valve 102 and end plate 120 for the passage of fluid. These slots can be opened and closed by rotating disk valve 102. These valves cover the slots in the end plates when counter-rotated. The end plates and the disk valves are made of hard ceramic material and may be made in matched sets. At the bottom of the valves are protruding gear teeth 107 and 108 which mesh with right hand and left hand screws 138 and 139 mounted on shaft 106 which extends through housing 109 and packing gland 143 and is connected to solenoid or servomotor 110.

Referring again to FIG. 2, as a compressor, the screw compressor is provided with a suction chamber or cavity to provide a large suction area for the compressor. As previously described, to function as an expander an end plate is provided with slots and valves to close off this chamber from the rotors, so that incoming pressurized fluid is forced to enter the unit through inlet nozzle 112. The formerly blank plate at the outlet end, which provided for the compressing of the fluid, is fitted with valve and slots communicating with exhaust chamber 134 which communicates with outlet nozzle 113 for the exhaust of the expanded fluid. As an expander, the compressed fluid enters the expansion chamber through the nozzle until the lobes pass inlet control ledges 171 which act as "cut-off" and expansion of the fluid begins. As a compressor, the fluid is compressed against the end plate with valves and slots now closed and is exhausted when the lobes reach outlet control ledges 172. As a compressor or expander there will be superheating of the fluid, particularly if steam is used, and the invention provides for the desuperheating of same by means of water injection which also assists in the sealing.

While in accordance with the provisions of the patent statute the preferred forms and embodiments of the invention have been illustrated and described, it will be apparent to those skilled in the art that various changes and modifications may be made without deviating from the inventive concepts set forth above.

What is claimed is:

1. In a screw-type compressor/expander comprising a housing with an inlet end and an outlet end, and two matching profile rotors with male and female lobes helically wrapped to form endless screws, the improvement comprising
   (a) end plates at each axial end of the rotors, said end plates having spaced ports; and
   (b) valve gates selectively slidable in opposite directions with respect to each end plate to selectively open one of compression mode ports and expansion mode ports, respectively, whereby when the expansion mode ports are selected, the rotors and the housing enclose spaces initially opening to the inlet end that have a volume that expands as the rotors are turned and when the compression mode ports are selected, the rotors and the housing enclose spaces initially opening at the inlet end and then closing such that the volume of the spaces contracts as the rotors are turned.

2. A screw-type compressor/expander as defined in claim 1, wherein said valve gates comprises rotating disk-type valves including gear teeth, and further comprising means for selectively rotating said valves including a shaft having screws arranged thereon meshing with said valve gear teeth, respectively, and a servo motor for rotating said shaft and said screws, thereby rotating said valves to selectively open and close the respective ports.

3. A screw-type compressor/expander as defined in claim 2, wherein the housing and rotors and said valve gates and end plates are formed of ceramic material.

4. A screw-type compressor/expander as defined in claim 2, and further comprising means for injecting liquid into the compressor/expander for desuperheating compressed fluid and expanded fluid, respectively, after the lobes have passed ledges adjacent the inlet end.

* * * * *